Patented Dec. 19, 1950

2,534,676

UNITED STATES PATENT OFFICE 2,534,676

PREPARATION OF COMPOUNDS OF URANIUM AND NONMETALS

Amos S. Newton and Oliver Johnson, Ames, Iowa, assignors to the United States of America as represented by the United States Atomic Energy Commission No Drawing. Application February 16, 1945, Serial No. 578,346

9 Claims. (Cl. 23—14.5)

This invention relates to the production of uranium compounds of various non-metals. The production of such products frequently is complicated by the fact that the reaction products tend to coat the surface of the metal or other product from which the uranium compound is being produced and thus to inhibit further reaction. Moreover, the problem of producing the product in a pulverulent form which is comparatively pure or is easy to purify and which may be prepared at a rapid rate is often difficult.

In accordance with the present invention, it has been found that uranium compounds of non-metallic elements particularly non-metals such as sulphur, selenium, tellurium, nitrogen, phosphorus, arsenic, carbon and boron may be prepared in a simple manner from uranium hydride. In general, uranium compounds of any non-metallic element contained in groups III, IV, V, and VI of the periodic table of the elements, may be prepared from uranium hydride in accordance with the present invention. Such compounds may be formed above, at or below the decomposition temperature of the hydride but preferably the reaction should be conducted at a rate sufficiently slow to prevent substantial fusion or caking of the reaction mixture due to evolution of heat at an excessive rate. Where the reaction involved is highly exothermic, proper precautions may be necessary in order to limit the rate of reaction to prevent such fusion. On the other hand, this problem does not arise where the reaction is endothermic or not appreciably exothermic. The process is especially applicable to the production of binary compounds from uranium hydride and a hydride of a non-metal.

In accordance with a particularly effective modification of the invention, the compounds of uranium and non-metals may be prepared from uranium metal through the intermediate of uranium hydride. Thus, uranium metal may be converted to the hydride by reaction with hydrogen and thereafter the hydride may be subjected to the action of non-metallic elements or their compounds preferably in gaseous state to form compounds herein contemplated. If desired, the uranium hydride which is formed in a pulverulent state may be decomposed to metal by heating above the decomposition temperature of the hydride and the finely divided highly reactive metal reacted in this manner. However, such a decomposition step is unnecessary since the reaction may be conducted directly with the hydride thereby eliminating a step in the operation. In this case more or less intermediate decomposition of the hydride to metal may tend to occur during reaction of the hydride with the non-metal or its compound. Whether such decomposition actually takes place is uncertain since the non-metallic compound is formed in any event and the exact mechanism of reaction is unknown. Thus, the term "reacting with uranium hydride" is intended to cover a process wherein uranium hydride is subjected to the action of a reactant to form ultimately another uranium compound regardless of the mechanism involved and irrespective of whether or not metallic uranium is formed as an intermediate in the operation.

This process is particularly effective when applied to the production of non-metal-uranium compounds from lumps or turnings of massive uranium which is free or substantially free from oxide within the interior thereof. Such metal may be disintegrated rapidly by reaction with hydrogen thereby providing finely divided hydride or metal powder which is highly reactive. Preferably, the reactions are carried out in a closed system in which the hydrogen and the non-metal or the substance comprising the non-metal are successively introduced into the system for reaction with the uranium or the uranium hydride product and air is excluded at least during production of the hydride. The preparation of the desired non-metal compound of uranium is carried out under suitable reaction conditions with respect to temperature, pressure, and the like such as to prevent or minimize caking, agglomeration or fusion of the reactive mass.

Thus, it is an object of the invention to provide an improved process for the preparation of a compound of uranium and a non-metal element.

A further object of the invention is the preparation of a binary compound of uranium and a non-metal element by the reaction of a uranium hydride product with a non-metal hydride.

Further objects and advantages will be apparent from the following description.

In preparation of uranium hydride prior to the reaction of uranium hydride and the non-metal element, it is desirable to have a relatively pure source of hydrogen for converting the uranium to uranium hydride. Impurities such as oxygen present in the hydrogen tend to contaminate the uranium hydride product resulting from the reaction. Hydrogen as ordinarily obtained from commercial sources may be used for this purpose. If an unusually pure uranium hydride product is desired, the hydrogen may be obtained from the decomposition of previously prepared uranium hydride.

The hydride preferably is formed from uranium metal in massive or bulky form which is substantially free from oxide in the interior of the lumps or bodies which are of substantial size or turnings from said bodies usually having a size not less than about 10 mesh. This uranium may be prepared by forming molten uranium and collecting it as a molten pool in a non-oxidizing atmosphere to permit separation of impurities after which the collected metal may be allowed to solidify in the form of billets, ingots or other suitable massive form.

The massive uranium may be treated with oxygen as such or turnings or shavings thereof may be treated. Moreover, powdered metal may be treated although the invention is particularly concerned with massive metal since it affords a simple method of forming the various compounds of uranium without the caking or surface coating which may otherwise be encountered.

The hydride may be reacted with the non-metals such as those previously listed in elemental state or with their compounds in gaseous state. A particularly effective reaction may be secured by reacting the hydrides of these non-metals with uranium hydride. For example, methane, ethane, ethylene, butylene, acetylene, borohydrides such as diborane ($B_2H_6$) phosphorous hydride, the silicon hydrides, $SiH_4$, $Si_2H_6$, $Si_3H_8$, etc., hydrogen telluride, arsenic hydride, hydrogen sulphide, hydrogen selenide or ammonia may be used in gaseous state for this process. In such a case, a binary compound of uranium and the non-metal is produced.

The non-metal material used to treat the uranium hydride is preferably one that may be used in vapor or at least fluid form. Certain of the non-metals occur naturally in gaseous state and may be used either in elemental form or in the form of a compound that may be vaporized at convenient temperatures. Other non-metals that occur naturally in solid state may be vaporized at suitable temperatures for purposes of the reaction. Those non-metals that do not easily volatilize are preferably converted into a compound which is easily vaporized, such as, for example, by being converted to a hydrogen compound of the non-metal element, before being reacted with the uranium hydride product.

In order to secure a finely divided product which is relatively pure or is easy to purify the temperature of reaction should be maintained below that at which the reaction mass including the reaction products fuse to the extent that substantial caking or agglomeration occurs. Where little heat is evolved during the production of the non-metal-uranium compound, the temperature may be maintained at the desired value by external heating.

The reaction may be conducted in any convenient reactor in which a gas-solid or liquid-solid reaction can occur. For example, a shaft furnace or a rotary reactor may be used. The non-metal or its compound may be passed through or over a porous pulverulent mass of uranium hydride or a solution thereof may be agitated with the hydride at reacting temperatures.

In those embodiments of the invention in which the non-metal compound of uranium is prepared by reacting uranium and hydrogen to form a uranium hydride product and then reacting such uranium hydride product with a non-metal material to form the uranium non-metal compound, it is desirable to carry out both reactions successively in a single closed system. Where the single system is used for both the hydrogenation and the reaction of uranium and the non-metal, the uranium hydride product is found to be in a more reactive state than where it is exposed to air prior to the step of reacting uranium and the non-metal.

In the first step of the process, the uranium may be converted to uranium hydride by passing gaseous hydrogen into contact with uranium metal in the form of lumps, turnings, etc., at a temperature of between 200° C. and 400° C. Prior to the hydrogen treatment, the uranium metal is cleaned with an acid, such as $6NHNO_3$, to remove surface impurities such as uranium oxides, uranium carbides, or the like. Where the uranium metal is not cleaned, the impurities remain in the reaction chamber and tend to contaminate the final uranium non-metal compound. The cleaned uranium, in the form of lumps, turnings, or the like is placed in a closed receptacle or reactor more or less impermeable. Dry hydrogen is then introduced into the reaction chamber to completely flush out the reaction chamber. If desired, the air in reaction chamber may be removed by evacuating means through exhaust tube with stopcocks closed.

After the air is removed from the reaction chamber, the reactor is heated to reaction temperature to heat the uranium metal to a temperature of between 200° C. and 400° C. Preferably, the temperature of the uranium is brought to approximately 250° C. Hydrogen is introduced into the reaction chamber at or below atmospheric pressure, the hydrogen reacting with the uranium metal to form uranium hydride. While there is a tendency for the hydrogen to lower the temperature of the uranium, the reaction is exothermic with approximately 30,000 calories per mole of uranium hydride being released to aid in maintaining the temperature of the uranium. Preferably, between 20% and 40% excess of hydrogen over that reacted with the uranium is used, the excess hydrogen passing out of the reaction chamber through a suitable outlet.

As the reaction proceeds, the uranium hydride is formed as a powder on the uranium metal. If uranium is in the form of a metallic mass of substantial size and is supported so that the under and vertical sides are exposed to the hydrogen, the uranium hydride tends to slough off as it is formed thereby exposing additional metal for the reaction. This continues until substantially all of the uranium is converted to uranium hydride. The uranium hydride is a brownish-black or brownish-grey pyrophoric powder, with the purer portions having a dark grey appearance.

After the uranium has been converted to uranium hydride, the desired non-metal material in vapor state is admitted into contact with the hydride and the reaction to form the uranium compound of the non-metal is conducted.

The temperature of the reaction of the uranium hydride and the non-metal material varies with the particular material being reacted with uranium hydride product. Generally, the temperatures at which the reaction of the non-metal and the uranium hydride product is carried out is between 200° C. and 600° C. and preferably the temperature is maintained below the temperature at which fusion or agglomeration of the reacting mass tends to recur. After the reaction is complete, the uranium compound produced is removed from the reactor and further purified, if necessary, to remove unreacted starting materials by washing with solvents or gases or by other suitable separation process and the resulting product is recovered.

The above described process also may be carried out by use of previously prepared uranium hydride which may be placed in the reactor and reacted with the non-metal or its compound as herein contemplated. When the process is carried out in this manner, the presence of impurities such as uranium oxide or the like, may increase the time required for the reaction and may decrease the yield of the uranium hydride product. Such impurities are not normally present where the uranium hydride is prepared in situ from the clean uranium metal.

The following specific examples of the process embodying the invention include certain of the non-metal materials that may be used in carrying out the process.

Example I

A quantity of uranium turnings was placed in a quartz reaction vessel and converted to the hydride at 250° C. as previously described. Gaseous $H_2S$ was then passed through the reaction mixture while the temperature was maintained at 500° C. for a period of 4 hours. A black powdered material having a composition corresponding to the formula $US_2$ was secured.

Example II

A quantity of uranium hydride was prepared in a reaction chamber and phosphine ($PH_3$) which had been previously dried with sulphuric acid was passed over the hydride while the temperature was maintained at about 400° C. A greyish-black phosphide having a uranium to phosphorus ratio of 2 uranium to 3 phosphorus was secured.

Example III

The process of Example II was repeated using ethylene in lieu of phosphine and maintaining the temperature of reaction mixture at about 500° C. A substantial quantity of uranium carbide was thus obtained.

Numerous other non-metal materials may be used in the process. These include hydrocarbons such as methane, other gaseous carbon compounds such as carbon dioxide, and oxygen and compounds that are easily vaporized such as water. Hydrides of the other non-metals have been used successfully in the process. Thus, diborane, silane, hydrogen telluride, hydrogen selenide, and arsenic hydrides have been used for this purpose. Carbon dioxide burns with $UH_3$ to form a mixture of the oxide together with some carbide. It is contemplated that other non-metal materials in which the non-metal constituent is in reactable form with respect to the uranium hydride product may be used.

The process of reacting uranium hydride with a halogenating agent such as pure halogen or a hydrohalide to prepare halides of uranium is claimed in our copending application, Serial No. 578,538 filed February 17, 1945. In our copending application, Serial No. 599,067 filed June 12, 1945, the reaction for the preparation of uranium nitride by the reaction between hydride and a member of the group consisting of ammonia and nitrogen is disclosed and claimed.

The above detailed description is given for purposes of illustration, and the invention is to be limited only by the scope of the appended claims.

What is claimed is:

1. A process of preparing a compound of a non-metal and uranium which comprises reacting uranium hydride with the vapors of a compound of hydrogen and a non-metal selected from groups III, IV, V, and VI of the periodic table.

2. The method of preparing a compound of a non-metal and uranium which comprises reacting a uranium hydride with a gaseous compound of hydrogen and a non-metal selected from groups III, IV, V, and VI of the periodic table.

3. The method of preparing a binary compound of a non-metal and uranium which comprises reacting a uranium hydride with the vapors of a binary compound of hydrogen and a non-metal selected from groups III, IV, V, and VI of the periodic table, at a temperature sufficiently high to permit reaction to occur but insufficient to cause the reaction mass to substantially fuse.

4. A method of forming a compound of a non-metal and uranium which comprises heating together uranium hydride and the vapors of a compound of hydrogen and a non-metal selected from groups III, IV, V, and VI of the periodic table.

5. A method of forming a binary compound of a non-metal and uranium which comprises reacting a metallic uranium body of substantial size with hydrogen to produce pulverulent uranium hydride having a particle size substantially less than that of the metallic uranium and reacting said hydride with the vapors of a binary compound of hydrogen and a non-metal selected from groups III, IV, V, and VI of the periodic table.

6. A method of preparing a binary compound of a non-metal and uranium which comprises introducing hydrogen into a reactor containing metallic uranium while maintaining said uranium at an elevated temperature of 200 to 300° C., thereby converting said uranium to a uranium hydride and passing the vapors of a binary compound of hydrogen and a non-metal selected from groups III, IV, V, and VI of the periodic table into contact with the uranium hydride while maintaining said uranium hydride at an elevated temperature between 200 and 600° C.

7. A method of preparing a compound of sulfur and uranium which comprises reacting a uranium hydride with hydrogen sulfide.

8. A method of preparing a compound of phosphorus and uranium which comprises reacting uranium hydride with phosphine.

9. A method of preparing a compound of boron and uranium which comprises reacting a uranium hydride with diborane.

AMOS S. NEWTON.
OLIVER JOHNSON.

REFERENCES CITED

The following references are of record in the file of this patent:

UNITED STATES PATENTS

| Number | Name | Date |
|---|---|---|
| 1,816,830 | Driggs | Aug. 4, 1931 |
| 1,835,024 | Driggs | Dec. 8, 1931 |
| 1,893,296 | Lilliendahl et al. | Jan. 3, 1933 |
| 1,967,952 | Warnke | July 24, 1934 |

OTHER REFERENCES

"Chemical News," volume CXXII, No. 3189, May 27, 1921, "The Metallic Hydrides and the Action of Hydrogen on the Metals," Tomkinson.

"Introductory Information on Lithium Hydride," Lithaloys Corporation. (Copy in Division 59.)

Mellor, Inorganic and Theoretical Chemistry, volume 7, page 207; volume 2, page 483.